US009281918B2

(12) United States Patent
Lim et al.

(10) Patent No.: US 9,281,918 B2
(45) Date of Patent: Mar. 8, 2016

(54) MULTICARRIER COMMUNICATION SYSTEM, AND ADAPTIVE CARRIER SELECTION AND LINK QUALITY REPORTING METHOD FOR THE SAME

(75) Inventors: Jun Sung Lim, Seoul (KR); Hi Chan Moon, Yongin-si (KR); Jin Ho Kim, Seoul (KR); Jung Su Han, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 924 days.

(21) Appl. No.: 13/080,000

(22) Filed: Apr. 5, 2011

(65) Prior Publication Data
US 2011/0243015 A1 Oct. 6, 2011

(30) Foreign Application Priority Data

Apr. 5, 2010 (KR) ........................ 10-2010-0031071

(51) Int. Cl.
*H04L 12/26* (2006.01)
*H04L 1/00* (2006.01)
*H04L 5/00* (2006.01)

(52) U.S. Cl.
CPC .............. *H04L 1/0026* (2013.01); *H04L 1/003* (2013.01); *H04L 5/0044* (2013.01); *H04L 5/0091* (2013.01)

(58) Field of Classification Search
CPC .......... H04W 72/0413; H04W 72/042; H04W 72/085; H04L 1/0026; H04L 1/003; H04L 5/0044; H04L 5/0091
USPC ................................................ 370/252, 329
See application file for complete search history.

(56) References Cited

U.S. PATENT DOCUMENTS

| 8,184,599 | B2 * | 5/2012 | Gholmieh et al. ............ 370/335 |
| 2007/0189199 | A1 | 8/2007 | Nishio |
| 2008/0165756 | A1 | 7/2008 | Ma |

(Continued)

FOREIGN PATENT DOCUMENTS

| CN | 1893341 A | 1/2007 |
| CN | 1938968 A | 3/2007 |

(Continued)

OTHER PUBLICATIONS

Catt, CMCC, Detail of CC (de-)activation, 3GPP TSG_RAN WG2#69 R2-101056, Feb. 22, 2010.

(Continued)

*Primary Examiner* — Brian J Gillis
*Assistant Examiner* — Amy Ling
(74) *Attorney, Agent, or Firm* — Jefferson IP Law, LLP (57) ABSTRACT

A link quality reporting method and apparatus, and a carrier selection method and apparatus, for a multicarrier communication system utilizing carrier aggregation are disclosed. In the system, the user equipment measures, for each component carrier divided into a Physical Downlink Shared Channel (PDSCH) resource region and a Physical Downlink Control Channel (PDCCH) resource region, link quality of the PDSCH resource region and the PDCCH resource region of the component carrier and sends measured link quality information as feedback information to the base station, and the base station adaptively selects a set of component carriers for control information transmission (i.e., a PDCCH Component Carrier (CC) SET) and a set of component carriers for data transmission (i.e., a DownLink (DL) CC SET) on the basis of the feedback information.

16 Claims, 5 Drawing Sheets

(56) References Cited

U.S. PATENT DOCUMENTS

| | | | |
|---|---|---|---|
| 2009/0028103 A1 | 1/2009 | Wang et al. | |
| 2009/0036116 A1 | 2/2009 | Kim et al. | |
| 2009/0258600 A1 | 10/2009 | Nishio et al. | |
| 2009/0310501 A1* | 12/2009 | Catovic | H04W 24/08 370/252 |
| 2010/0113078 A1* | 5/2010 | Farajidana et al. | 455/507 |
| 2010/0254268 A1* | 10/2010 | Kim et al. | 370/241 |
| 2010/0254329 A1* | 10/2010 | Pan et al. | 370/329 |
| 2010/0303011 A1* | 12/2010 | Pan et al. | 370/328 |
| 2011/0026422 A1* | 2/2011 | Ma et al. | 370/252 |
| 2011/0122794 A1* | 5/2011 | Kim et al. | 370/252 |
| 2011/0134774 A1* | 6/2011 | Pelletier et al. | 370/252 |
| 2011/0143749 A1* | 6/2011 | Guo et al. | 455/424 |
| 2011/0199908 A1* | 8/2011 | Dalsgaard et al. | 370/241 |
| 2011/0205978 A1* | 8/2011 | Nory et al. | 370/329 |
| 2011/0212693 A1* | 9/2011 | Sagfors | H04W 36/0083 455/67.11 |
| 2011/0243048 A1* | 10/2011 | Wang et al. | 370/311 |
| 2011/0255469 A1 | 10/2011 | Kishiyama et al. | |
| 2011/0269449 A1* | 11/2011 | Kazmi | H04B 7/024 455/422.1 |
| 2011/0274057 A1* | 11/2011 | Kuo | 370/329 |
| 2012/0051313 A1* | 3/2012 | Seo et al. | 370/329 |
| 2012/0115468 A1* | 5/2012 | Lindoff et al. | 455/434 |
| 2012/0155312 A1* | 6/2012 | Kim et al. | 370/252 |
| 2012/0182958 A1* | 7/2012 | Pelletier et al. | 370/329 |
| 2012/0207123 A1* | 8/2012 | Seo et al. | 370/329 |
| 2012/0269153 A1* | 10/2012 | Seo et al. | 370/329 |
| 2012/0281667 A1* | 11/2012 | Chang et al. | 370/329 |
| 2012/0314675 A1* | 12/2012 | Vujcic | 370/329 |
| 2012/0327910 A1* | 12/2012 | Dalsgaard et al. | 370/335 |
| 2013/0016639 A1 | 1/2013 | Xu et al. | |
| 2013/0121132 A1 | 5/2013 | Terry | |
| 2013/0153298 A1* | 6/2013 | Pietraski et al. | 175/45 |
| 2013/0195071 A1* | 8/2013 | Ohta et al. | 370/330 |

FOREIGN PATENT DOCUMENTS

| | | |
|---|---|---|
| CN | 101547477 A | 9/2009 |
| JP | 2008-539606 A | 11/2008 |
| JP | 2010-74754 A | 4/2010 |
| JP | 2013-516859 A | 5/2013 |
| WO | 2009-117944 A1 | 10/2009 |
| WO | 2010016680 A2 | 2/2010 |

OTHER PUBLICATIONS

Media Tek Inc., Measurement Events Generalization for Carrier Aggregation[online], 3GPP TSG_RAN WGS#69bis R2-101146, Feb. 22, 2010.

Huawei, Horizontal and Vertical Mobility, 3GPP TSG-RAN WG2#69bis R2-102022, Apr. 3, 2010.

ZTE, CSI-RS Pattern Desogn for LTE-Advanced, 3GPP TSG-RAN WG1#60 R1-100969, Feb. 22, 2010.

New Postcom, PDCCH monitoring set and carrier activation 3GPP TSG-RAN WG1#60 R1-101003, Feb. 22, 2010.

Japan Search Report for patent accplication No. JP 2013-503657, May 26, 2015.

* cited by examiner

| CC ID | Report type | CQ A | |
|---|---|---|---|

| CC ID | Report type | CQ B | |
|---|---|---|---|

| CC ID | Report type | CQ A | CQ B |
|---|---|---|---|

FIG. 6

MULTICARRIER COMMUNICATION SYSTEM, AND ADAPTIVE CARRIER SELECTION AND LINK QUALITY REPORTING METHOD FOR THE SAME

PRIORITY

This application claims the benefit under 35 U.S.C. §119(a) of a Korean patent application filed on Apr. 5, 2010 in the Korean Intellectual Property Office and assigned Serial No. 10-2010-0031071, the entire disclosure of which is hereby incorporated by reference.

BACKGROUND OF THE INVENTION

1. Field of the Invention

The present invention relates to a communication system and communication method for the same. More particularly, the present invention relates to a multicarrier communication system for high-speed mobile communication based on multiple carriers, and to an adaptive carrier selection method and a link quality reporting method for the same.

2. Description of the Related Art

Fourth Generation (4G) mobile communication technology has adopted carrier aggregation for further evolution. Carrier aggregation enables multiple adjacent or non-adjacent Component Carriers (CC) to be used as a single frequency band so as to provide higher data transfer rates.

To transmit and receive data using multiple component carriers at the same time, the complexity of transceivers linearly increases with the number of component carriers used. That is, as the number of component carriers used in carrier aggregation increases, the complexity of transceivers increases. Hence, the maximum number of component carriers simultaneously used between a specific base station (e.g. an evolved Node B (eNB)) and a user equipment may be limited by the maximum number of component carriers simultaneously available in the base station and be set according to the capabilities of the user equipment. For efficient carrier aggregation, adaptive component carrier selection is needed that enables the base station to select component carriers preferred by a specific user equipment for data transfer. Similarly, adaptive component carrier selection is also necessary for the base station to send control information using component carriers preferred by the user equipment.

For data transfer in a communication system, schemes adaptive to channel environments are used in modulation and coding and transmit power determination. To achieve this, the base station receives reports on link quality of the whole resource region or data transport region from a user equipment. To transmit data using multiple component carriers, the base station may have to receive a link quality report for each component carrier from the user equipment. Using collected link quality information, the base station may adaptively select component carriers to be used for data transport to a particular user equipment.

A careful approach is needed for control information transport. When the transmission resource region for control information is separated from the transmission resource region for data, link quality for control information transport may differ from that for data transport. Hence, determination of component carriers for control information transport utilizing link quality information related to data transport may cause problems. In particular, when the base station selects inappropriate component carriers for control information transport, the user equipment may fail to receive control information. This may degrade transmission efficiency and cause at least one of the user equipment to malfunction and communication failure. To address such problems, if the base station receives a link quality report on the transmission resource region for control information from a user equipment, the base station may experience additional overhead. Accordingly, a feedback method to be performed by the user equipment is needed that helps the base station to select appropriate component carriers for control information transport, and a method of determining component carriers for control information transport is needed for the base station.

SUMMARY OF THE INVENTION

Aspects of the present invention address the above-mentioned problems and/or disadvantages and provide at least the advantages described below. Accordingly, an aspect of the present invention is to provide methods for adaptively selecting component carriers and for delivering feedback information to thereby increase efficiency in transmitting data and control information using multiple component carriers.

In accordance with an aspect of the present invention, a link quality reporting method for a user equipment in a multicarrier communication system employing carrier aggregation is provided. The method includes measuring, during communication with a base station through one or more activated component carriers that are selected from multiple available component carriers, link quality of each activated component carrier by dividing the activated component carrier into an active region for control information and an active region for data, and separately measuring link quality of the two active regions, and reporting the measured link quality of each activated component carrier to the base station.

In accordance with another aspect of the present invention, a carrier selection method for a base station in a multicarrier communication system employing carrier aggregation is provided. The method includes determining component carriers to be activated, estimating link quality of each of the determined component carriers for control information, and selecting one or more component carriers to be used for transmitting the control information from the determined component carriers according to the estimated link qualities.

In accordance with another aspect of the present invention, a link quality reporting apparatus in a multicarrier communication system employing carrier aggregation is provided. The apparatus includes a receiving unit for receiving a signal from a base station through one or more activated component carriers that are selected from multiple available component carriers, a channel measurement unit for measuring, upon signal reception, link quality of each activated component carrier by dividing the activated component carrier into an active region for control information and an active region for data, and for separately measuring link quality of the two active regions, and a transmitting unit for reporting the measured link quality of each activated component carrier to the base station under control of the channel measurement unit.

In accordance with another aspect of the present invention, a carrier selection apparatus in a multicarrier communication system employing carrier aggregation is provided. The apparatus includes a determination unit for determining component carriers to be activated, an estimation unit for estimating link quality of each of the determined component carriers for control information, and a selection unit for selecting one or more component carriers to be used to transmit the control information from among the determined component carriers according to the estimated link qualities.

In a feature of the present invention, the methods contribute to enhancing per-carrier transmission efficiency and to preventing system malfunction due to control information reception failure in a multicarrier communication system.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a multicarrier communication system that uses multiple component carriers to perform information transmission.

Figure 1:
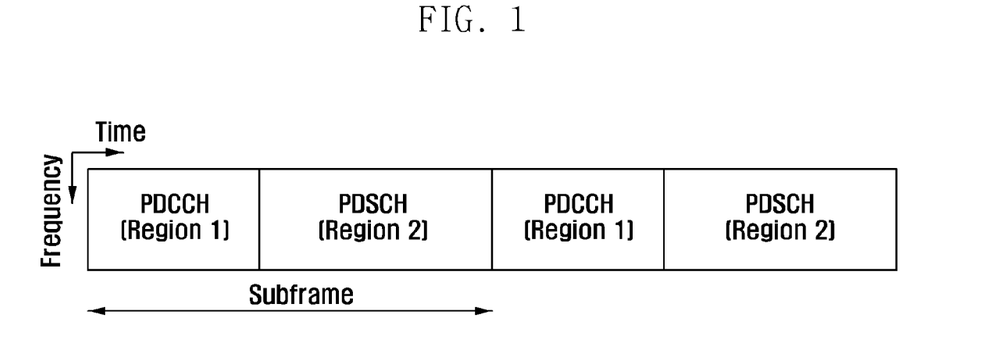
FIG. 1 illustrates a carrier component structure in a multicarrier communication system according to an exemplary embodiment of the present invention.

FIG. 1 illustrates a carrier component structure in a multicarrier communication system according to an exemplary embodiment of the present invention.

Referring to FIG. 1, a component carrier is divided in time into subframes and each subframe is composed of a Physical Downlink Shared Channel (PDSCH) resource region for data and a Physical Downlink Control Channel (PDCCH) resource region for control information.

In an exemplary embodiment of the present invention, a user equipment may measure two types of link quality for each component carrier. First, the user equipment may measure link quality of the PDCCH resource region (referred to as Channel Quality (CQ) A). Second, the user equipment may measure link quality of the whole or PDSCH resource region (referred to as CQ B). That is, to measure CQ B, the user equipment may measure link quality of a resource region covering the PDCCH resource region and the PDSCH resource region or measure link quality of the PDSCH resource region.

Various schemes can be used for link quality measurement (or channel status measurement). A relatively simple scheme is to use a common Reference Signal (RS). The Long Term Evolution (LTE) system should always transmit a reference signal at a fixed location and with the same power. Hence, link quality may be obtained by measuring the magnitude of a received signal and the amount of interference with reference to the reference signal. The total received power of an Orthogonal Frequency-Division Multiplexing (OFDM) symbol carrying the reference signal may be used as the amount of interference. Alternatively, the value obtained by subtracting the received power of the reference signal from the above total received power may be used as the amount of interference. The present invention is not limited to any specific means for link quality measurement, and any link quality measurement scheme may be used.

Herein, assume that the base station uses a total of N component carriers to communicate with a plurality of user equipments, and one user equipment activates M component carriers (M<N) to send and receive data to and from the base station. The set of activated component carriers for communication with a specific user equipment is referred to as a "DownLink (DL) Component Carrier (CC) SET" and the set of the other component carriers is referred to as a "Non DL CC SET". A group of component carriers in the DL CC SET used to carry control information related to resource allocation is referred to as a "PDCCH CC SET". Here, the DL CC SET and the PDCCH CC SET may differ for each user equipment and may vary dynamically, semi-statically or statically with time.

Figure 2:
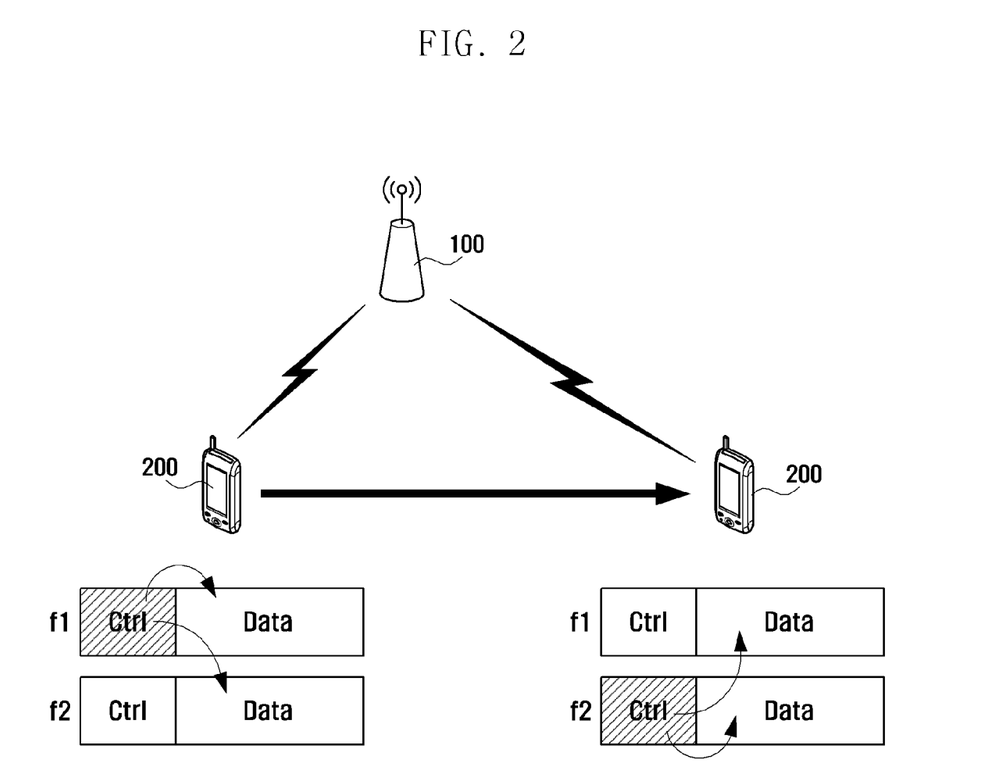
FIG. 2 illustrates the configuration of the multicarrier communication system according to an exemplary embodiment of the present invention.

FIG. 2 illustrates the configuration of the multicarrier communication system according to an exemplary embodiment of the present invention. In FIG. 2, preferred component carriers are changed as a user equipment moves.

Referring to FIG. 2, the multicarrier communication system includes a base station 100 and a user equipment 200. The base station 100 aggregates multiple component carriers to provide communication services. The user equipment 200 receives a communication service through multiple component carriers. To determine a DL CC SET and a PDCCH CC SET in an adaptive manner, the user equipment 200 reports link quality measurement information used for component carrier determination to the base station 100, which then determines the DL CC SET and the PDCCH CC SET using the link quality measurement information. Here, for convenience of description, the information reported by the user equipment 200 to the base station 100 is divided into Channel Quality Information (CQI) (i.e., CQ B) of the DL CC SET and other information.

Figure 3:
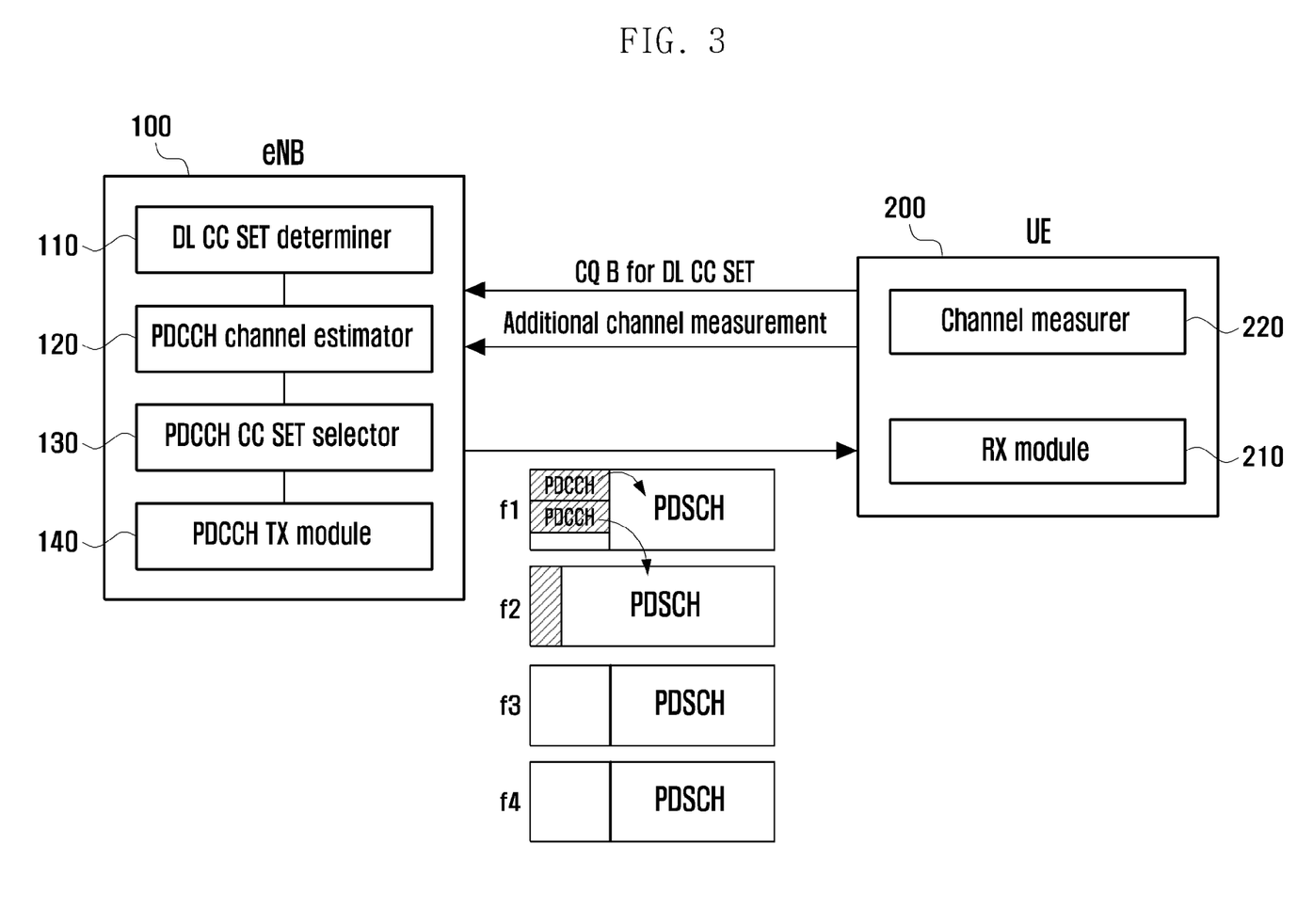
FIG. 3 illustrates configurations of a base station and a user equipment in a multicarrier communication system according to an exemplary embodiment of the present invention.

FIG. 3 illustrates configurations of a base station and user equipment in a multicarrier communication system according to an exemplary embodiment of the present invention.

Referring to FIG. 3, the base station 100 includes a DL CC SET determiner 110, a PDCCH channel estimator 120, a PDCCH CC SET selector 130 and a PDCCH Transmitter (Tx) module 140. The DL CC SET determiner 110 determines the DL CC SET with reference to information reported by the user equipment 200. The PDCCH channel estimator 120 generates control information for PDCCH transmission and estimates link quality for PDCCH transmission. The PDCCH CC SET selector 130 composes the PDCCH CC SET for control information transmission on the basis of the DL CC SET. The PDCCH Tx module 140 sends control information using the PDCCH CC SET.

The user equipment 200 includes a Receiver (Rx) module 210, a channel measurer 220 and a Tx module (not shown). The Rx module 210 receives a signal from the base station 100 through the DL CC SET. The channel measurer 220 measures link quality, that is, channel status related to the DL CC SET and the Non DL CC SET. The Tx module reports information including link quality information to the base station 100.

For example, in FIG. 3, the base station 100 communicates with multiple user equipments using a total of four component carriers f1, f2, f3 and f4; and the base station 100 and the user equipment 200 compose the DL CC SET by activating two component carriers f1 and f2 for communication among the four component carriers. In this case, the other component carriers f3 and f4 belong to the Non-DL CC SET.

That is, after receiving additional channel measurement information such as a preferred CC SET from the user equipment 200, the base station 100 determines the DL CC SET on the basis of the received information and determines the PDCCH CC SET for PDCCH transmission from the DL CC SET. Thereafter, using the PDCCH CC SET, the base station 100 sends resource allocation control information of the DL CC SET. For example, as in FIG. 2, the base station 100 may select f1 as an element of the PDCCH CC SET and send resource allocation control information of f1 and f2 through the PDCCH of f1. Alternatively, the base station 100 may select f2 as an element of the PDCCH CC SET and send resource allocation control information of f1 and f2 through the PDCCH of f2.

To be more specific, the user equipment 200 performs measurement to obtain a CQ B for each component carrier and additional channel measurement information, and reports some or all of the collected measurement information to the base station 100 according to preset conditions or a given period. Here, additional channel measurement information may include the following.

Additional information 1-1) link quality of a PDCCH resource region (i.e., CQ A) of a component carrier belonging to the DL CC SET Additional information 1-2) a CQ B of a component carrier belonging to the Non DL CC SET Additional information 1-3) a CQ A of a component carrier belonging to the Non DL CC SET There are various situations in which the user equipment 200 reports Additional information 1-1. First, the user equipment 200 reports CQ A for each component carrier according to a given period. Second, the user equipment 200 monitors and measures CQ A and CQ B of each component carrier belonging to the DL CC SET. When the difference between CQ A and CQ B of a component carrier is greater than or equal to a first threshold TH1 or is less than or equal to another threshold TH1_2, the user equipment 200 reports CQ A. Here, the thresholds TH1 and TH1_2 may be set to the same value. The base station 100 and the user equipment 200 may agree on these thresholds in advance for automatic reporting. Third, when the difference between CQ A and CQ B and the last reported value differ by at least a second threshold TH2, the user equipment 200 reports CQ A. Fourth, when CQ A becomes less than or equal to a third threshold TH3 or CQ A becomes greater than or equal to a fourth threshold TH4, the user equipment 200 reports CQ A. Fifth, when a time T0 or more elapses after last CQ A reporting, the user equipment 200 reports CQ A.

Equation 1 illustrates a condition under which the user equipment 200 reports Additional information 1-2 and 1-3 (i.e., CQ B and CQ A of a component carrier belonging to Non DL CC SET).

$$\text{CQ B of CC in Non DL CC SET} > \text{CQ B of lowest CC in DL CC SET} + \text{Margin 1} \quad \text{Equation 1}$$

Figure 4:
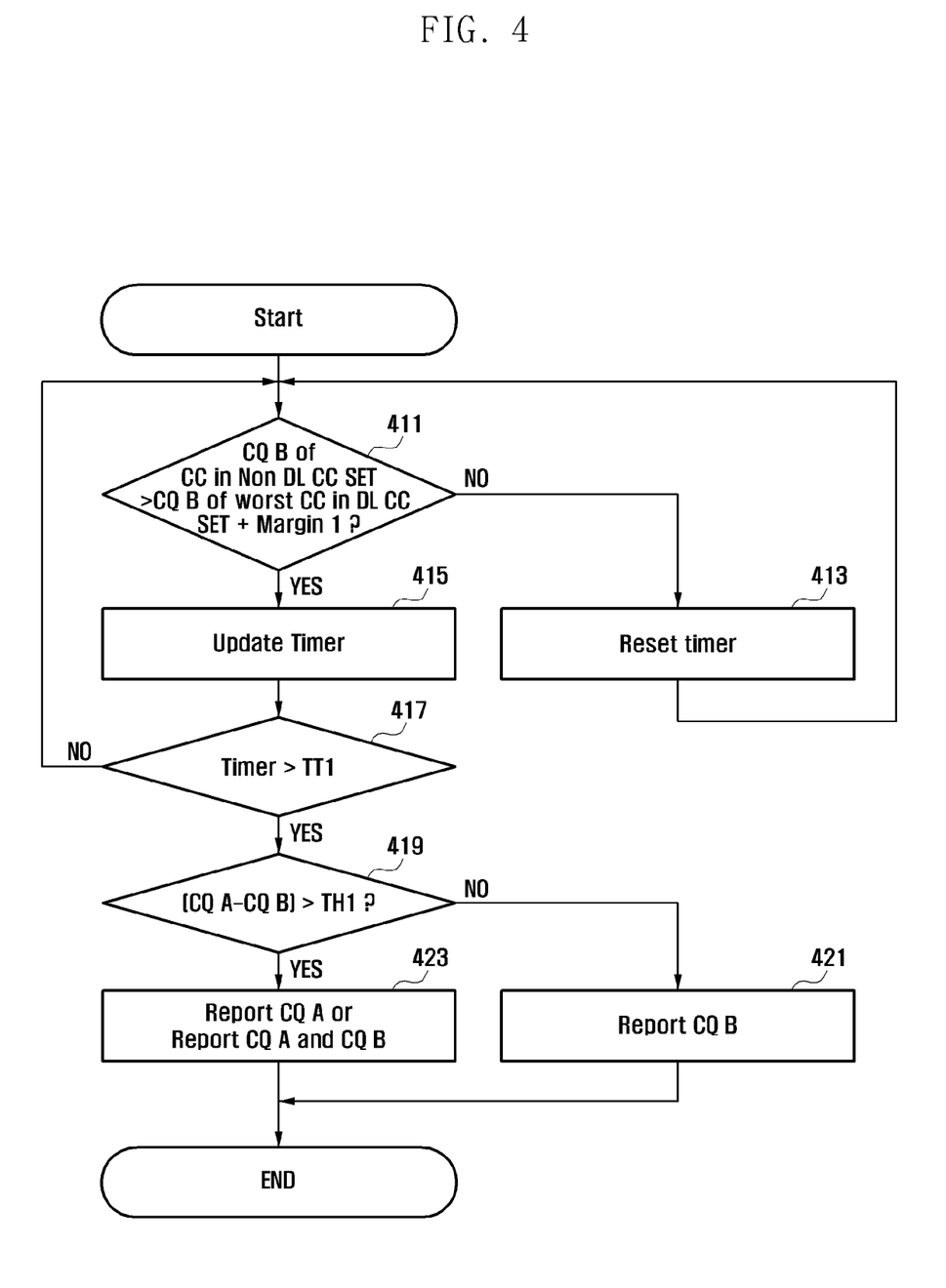
FIG. 4 is a flowchart of a link quality reporting method for a user equipment according to an exemplary embodiment of the present invention.

FIG. 4 is a flowchart of a link quality reporting method according to an exemplary embodiment of the present invention. FIG. 4 is related to link quality reporting for a Non DL CC SET of a user equipment.

Referring to FIG. 4, the user equipment 200 measures link qualities (i.e., CQ A and CQ B) for the DL CC SET and the Non DL CC SET and compares the measured link qualities in step 411. That is, the user equipment 200 determines whether CQ B of a component carrier in the Non DL CC SET exceeds the sum of CQ B of the lowest quality component carrier in the DL CC SET and Margin 1. Here, Margin 1 may be set to 0. When CQ B of a component carrier in Non DL CC SET does not exceed the sum, the user equipment 200 resets a timer in step 413 and returns to step 411. When CQ B of a component carrier in the Non DL CC SET exceeds the sum, the user equipment 200 updates the timer in step 415.

When the timer indicates that a preset time TT1 has not passed in step 417, the procedure returns to step 411. When the timer indicates that a preset time TT1 has passed in step 417, the user equipment 200 determines whether the difference between CQ A and CQ B of a corresponding component carrier is greater than the first threshold TH1 in step 419. Here, the time TT1 may correspond to one subframe. When the difference is not greater than the first threshold TH1, the user equipment 200 sends CQ B of the component carrier to the base station 100 in step 421. Thereafter, the procedure ends. When the difference is greater than the first threshold TH1, the user equipment 200 sends CQ A and CQ B of the component carrier to the base station 100 in step 423. Thereafter, the procedure ends.

Figure 5:
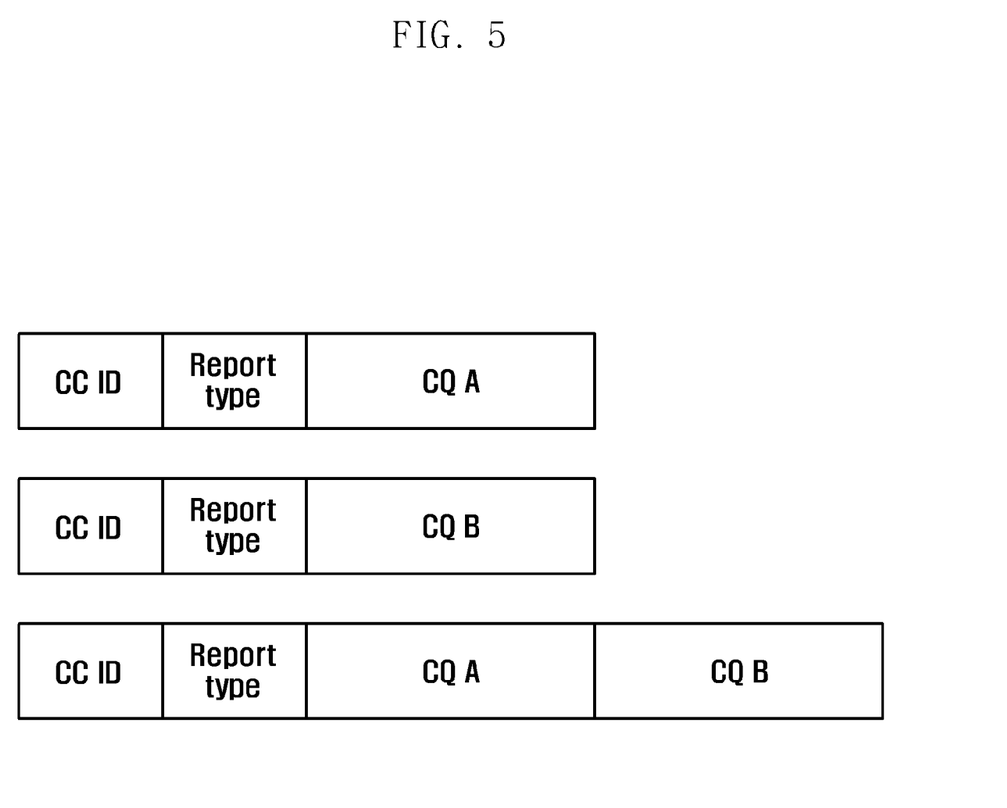
FIG. 5 illustrates a format of messages containing additional channel measurement information according to an exemplary embodiment of the present invention.

FIG. 5 illustrates a format of messages containing additional channel measurement information according to an exemplary embodiment of the present invention.

Referring to FIG. 5, a message for reporting additional channel measurement information may include a CC ID field containing the identifier of a component carrier, a report type field, and at least one CQ field. The report type field is used to distinguish CQ A for the DL CC SET, CQ B for the Non DL CC SET, and CQ A and CQ B for the Non DL CC SET. The CQ field may contain one of CQ A for the DL CC SET, CQ B for the Non DL CC SET, and CQ A and CQ B for the Non DL CC SET.

Resource allocation for additional information reporting may be performed as follows. First, the user equipment 200 may send a measurement information report by piggybacking the report on uplink data. Second, as an event driven approach, whenever an event triggering measurement reporting occurs, the user equipment 200 may request the base station 100 to allocate resources in the reverse direction for a measurement information report. The user equipment 200 may have to receive a grant for transmission in the reverse direction from the base station 100.

Upon reception of the above feedback information from the user equipment 200, the base station 100 composes the DL CC SET with M elements using the feedback information, and specifies an anchor component carrier and composes the PDCCH CC SET with K elements on the basis of the DL CC SET. To achieve this, the base station 100 composes the DL CC SET with M elements by selecting M highest-quality component carriers using recently received CQ B's of component carriers. When the new DL CC SET is different from the existing DL CC SET, the base station 100 updates the DL CC SET and notifies the user equipment 200 of the updated DL CC SET.

To determine the PDCCH CC SET, the base station 100 estimates the PDCCH link quality of each component carrier in the DL CC SET composed above. When CQ A is received from the user equipment 200 within a preset time TT2, the base station 100 regards CQ A as the PDCCH link quality. Otherwise, the base station 100 regards CQ B±Margin 2 as the PDCCH link quality. Thereafter, the base station 100 selects K component carriers in order of the PDCCH link quality to compose the PDCCH CC SET. The base station 100 transmits control information in one of the following ways. First, the base station 100 does not notify the user equipment 200 of a selected PDCCH component carrier in advance, and sends resource allocation information of a component carrier in the DL CC SET through the selected PDCCH component carrier. Second, the base station 100 notifies the user equipment 200 of a selected PDCCH component carrier in advance, and sends resource allocation information of a component carrier in the DL CC SET through the selected PDCCH component carrier. Third, the base station 100 links each component carrier in the DL CC SET with one PDCCH component carrier, notifies the user equipment 200 of the linkage information, and sends the PDSCH resource allocation information of a specific component carrier through the PDCCH of the PDCCH component carrier linked with the component carrier.

Figure 6:
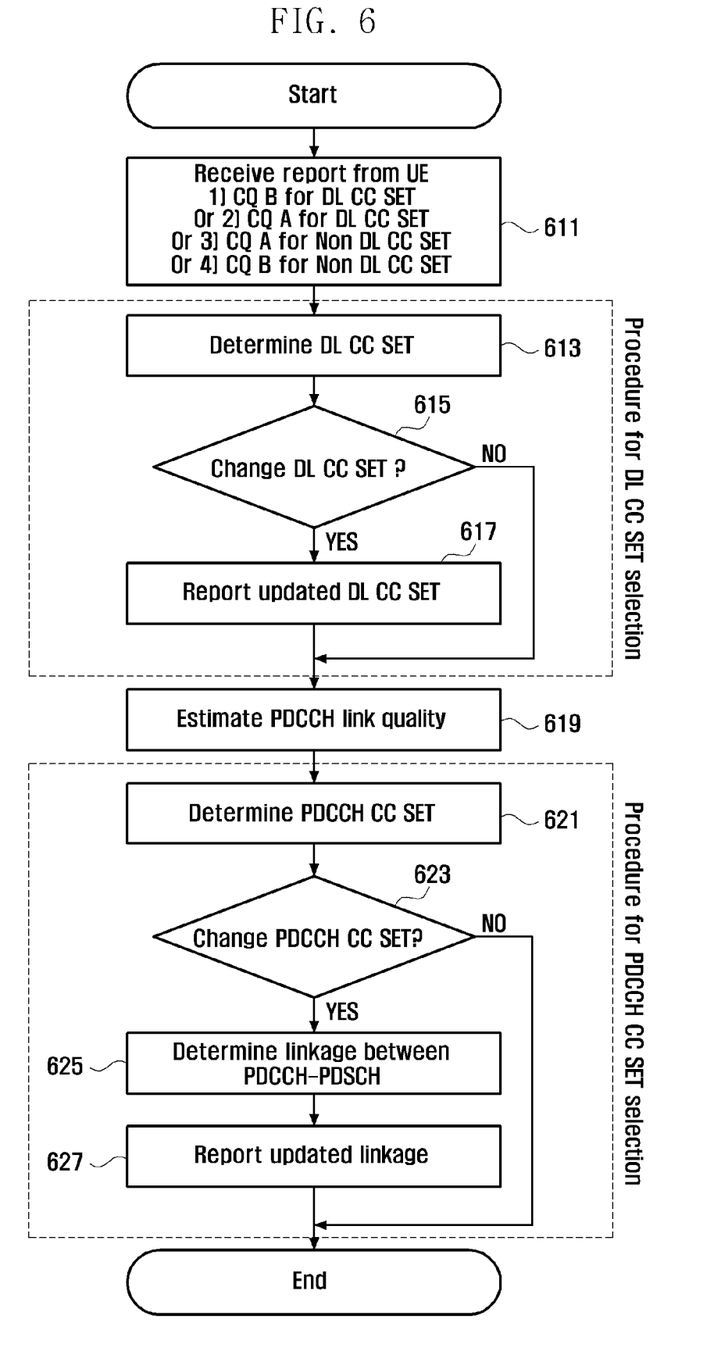
FIG. 6 is a flowchart of an adaptive carrier selection method for a base station according to an exemplary embodiment of the present invention.

FIG. 6 is a flowchart of an adaptive carrier selection method according to an exemplary embodiment of the present invention. FIG. 6 depicts a procedure of the base station 100 to determine the DL CC SET and the PDCCH CC SET and to announce these. In the description, it is assumed that the base station 100 notifies the user equipment 200 of information on links between the PDCCH component carriers and the component carriers belonging to the DL CC SET. Although the base station 100 is described as determining both the DL CC SET and the PDCCH CC SET, the present invention is not limited thereto. The base station 100 may determine only one of the DL CC SET and the PDCCH CC SET according to the previously described scheme.

Referring to FIG. 6, the base station 100 receives link quality information from the user equipment 200 in step 611. Here, the link quality information may include at least one of CQ A for the DL CC SET, CQ B for the DL CC SET, CQ A for the Non DL CC SET and CQ B for the Non DL CC SET. The base station 100 newly composes the DL CC SET with reference to the link quality information in step 613. The base station 100 determines whether the new DL CC SET is different from the existing one in step 615. That is, the base station 100 examines whether the DL CC SET is changed. When the DL CC SET is changed, the base station 100 notifies the user equipment 200 of new DL CC SET in step 617. When the DL CC SET is not changed, the user equipment 200 proceeds to step 619.

Thereafter, the base station 100 estimates the PDCCH link quality of each component carrier in the DL CC SET in step 619. The base station 100 newly composes the PDCCH CC SET with reference to the PDCCH link qualities in step 621. The base station 100 determines whether the new PDCCH CC SET is different from the existing one in step 623. That is, the base station 100 examines whether the PDCCH CC SET is changed. When the PDCCH CC SET is changed, the base station 100 newly sets up the PDCCH-PDSCH links in step 625, and notifies the user equipment 200 of the linkage information in step 627. Thereafter, the procedure ends. When the PDCCH CC SET is not changed, the procedure ends.

As apparent from the above description, the exemplary embodiments of the present invention contribute to enhancing per-carrier transmission efficiency and to preventing system malfunction due to control information reception failure in a multicarrier communication system.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A link quality reporting method for a user equipment in a multicarrier communication system employing carrier aggregation, the method comprising:
    measuring, during communication with a base station through activated component carriers that are selected from multiple available component carriers, a link quality of each activated component carrier; and
    reporting a measured link quality of each activated component carrier to the base station,
    wherein the measuring of the link quality of each activated component carrier comprises measuring a first measurement and a second measurement, the first measurement comprising a link quality of a first active region for control information, and the second measurement comprising measuring a link quality of a second active region for data or of a whole active region comprising the first active region for control information and the second active region for data.

2. The method of claim 1, further comprising measuring a link quality of each remaining component carriers that are non-activated and comprise an inactive region for control information and an inactive region for data, and separately measuring a link quality for each of the inactive regions.

3. The method of claim 2, further comprising reporting the measured link quality of each non-activated component carrier to the base station.

4. The method of claim 3, further comprising reporting, for one of the non-activated component carriers, when the difference between the link quality of the inactive region for control information and the link quality of the inactive region for data is less than or equal to a preset threshold, the link quality of the inactive region for data.

5. A carrier selection method for a base station in a multicarrier communication system employing carrier aggregation, the method comprising:
    receiving a link quality of each activated component carrier comprising an active region for control information and an active region for data from a user equipment;
    determining component carriers to be activated according to the received link qualities; and selecting one or more component carriers to be used for transmitting control information from the activated component carriers according to the received link qualities, wherein the receiving of the link quality of each activated component carrier comprises receiving a first link quality of a first active region for control information, and receiving a second link quality of a second active region for data or of a whole active region comprising the first active region for control information and the second active region for data.

6. The method of claim 5, further comprising notifying a corresponding user equipment of the activated component carriers.

7. The method of claim 6, further comprising notifying the user equipment of the selected component carriers.

8. The method of claim 6, further comprising linking, for transmission of data, the selected component carriers with component carriers not selected from the activated component carriers and notifying the user equipment of the component carriers linked with the selected component carriers through the selected component carriers.

9. A link quality reporting apparatus in a multicarrier communication system employing carrier aggregation, the apparatus comprising:

a receiving unit configured to receive a signal from a base station through activated component carriers that are selected from multiple available component carriers, wherein each of the activated component carriers comprises a first active region for control information and a second active region for data; and a channel measurer configured to measure, upon signal reception, link quality of the activated component carriers and configured to report a measured link quality of each activated component carrier to the base station, wherein the channel measurer is configured to measure a first link quality of the first active region for control information, and is configured to measure a second link quality of the second active region for data or of a whole active region comprising the first active region for control information and the second active region for data.

10. The apparatus of claim 9, wherein non-activated component carriers comprise an inactive region for control information and an inactive region for data, and the channel measurer is further configured to separately measure a link quality for each of the inactive regions.

11. The apparatus of claim 10, wherein a transmitting unit reports the measured link quality of each non-activated component carrier to the base station.

12. The apparatus of claim 11, wherein the transmitting unit further reports, for one of the non-activated component carriers, when the difference between the link quality of the inactive region for control information and the link quality of the inactive region for data is less than or equal to a preset threshold, the link quality of the inactive region for data.

13. A carrier selection apparatus in a multicarrier communication system employing carrier aggregation, the apparatus comprising:

a receiving unit configured to receive a link quality of each activated component carrier comprising a first active region for control information and a second active region for data from a user equipment;

a determiner configured to determine component carriers to be activated according to the received link qualities; and a selector configured to select one or more component carriers to be used to transmit control information from the activated component carriers according to the received link qualities, wherein the receiving unit is configured to receive a first link quality of the first active region for control information, and is configured to receive a second link quality of the second active region for data or of a whole active region comprising the first active region for control information and the second active region for data.

14. The apparatus of claim 13, further comprising a transmit module configured to notify a corresponding user equipment of the activated component carriers.

15. The apparatus of claim 14, wherein the transmit module is further configured to notify the user equipment of the one or more selected component carriers.

16. The apparatus of claim 14, wherein the selector is further configured to link, for transmission of data, the selected component carriers with component carriers not selected from the activated component carriers, and wherein the transmit module is further configured to notify the user equipment of the component carriers linked with the selected component carriers through the selected component carriers.

* * * * *